United States Patent [19]

Newton

[11] 3,897,788
[45] Aug. 5, 1975

[54] TRANSFORMER COUPLED POWER TRANSMITTING AND ISOLATED SWITCHING CIRCUIT

[75] Inventor: David W. Newton, Boulder, Colo.

[73] Assignee: Valleylab, Inc., Boulder, Colo.

[22] Filed: Jan. 14, 1974

[21] Appl. No.: 433,059

[52] U.S. Cl...... 128/303.14; 128/303.17; 323/22 T; 323/62
[51] Int. Cl............................................ A61b 17/36
[58] Field of Search..... 128/303.14, 303.17, 303.13, 128/303.1; 323/6, 8, 22 T, 22 SC, 62

[56] References Cited
UNITED STATES PATENTS

| | | | |
|---|---|---|---|
| 3,356,859 | 12/1967 | Wilson | 323/22 SC |
| 3,439,253 | 4/1969 | Piteo | 323/22 SC |
| 3,514,689 | 5/1970 | Giannamore | 323/62 |
| 3,551,786 | 12/1970 | Gulik | 323/22 SC |
| 3,675,655 | 7/1972 | Sittner | 128/303.14 |
| 3,699,967 | 10/1972 | Anderson | 128/303.14 |
| 3,801,800 | 4/1974 | Newton | 128/303.14 |
| 3,815,015 | 6/1974 | Swin et al. | 323/8 |

Primary Examiner—Richard A. Gaudet
Assistant Examiner—Lee S. Cohen
Attorney, Agent, or Firm—Burton, Crandell & Polumbus

[57] ABSTRACT

A transformer coupled power transmitting and isolated switching circuit is disclosed for use in an electrosurgical apparatus to transmit power from a power generator to a utilization instrument for enabling electrosurgery and to transmit mode information from the utilization instrument to the power generator for enabling control of the operational mode of the generator. The electrosurgical power generator is coupled to the utilization instrument through an isolating transformer. The isolating transformer is loaded in a preselected manner under the control of a logic circuit with the load on the isolating transformer then being sensed and the sensed loading information utilized to control the mode of operation of the power generator to assure that power generator operates in the desired mode for the electrosurgery function then required.

12 Claims, 3 Drawing Figures

TRANSFORMER COUPLED POWER TRANSMITTING AND ISOLATED SWITCHING CIRCUIT

CROSS-REFERENCE TO RELATED PATENTS AND APPLICATIONS

This application is related to U.S. Pat. No. 3,699,967 issued Oct. 24, 1972 and entitled "ELECTROSURGICAL GENERATOR" and U.S. Pat. No. 3,801,800 and entitled "ISOLATING SWITCHING CIRCUIT FOR AN ELECTROSURGICAL GENERATOR".

FIELD OF THE INVENTION

This invention relates to a power transmitting and isolated switching circuit and more particularly relates to a transformer coupled power transmitting and isolated switching circuit.

BACKGROUND OF THE INVENTION

It has oftentimes been found to be desirable to provide relatively high power from a power generator to a utilization instrument with such power being applied through a transformer. It has likewise been found to be desirable to control the operational mode of the power generator so that the delivered power is satisfactory for the intended purpose. When power is transmitted in one direction and operational mode information is transmitted in the opposite direction;, however, problems have frequently arisen, and this has been found to be particularly true, for example, in electrosurgery applications where high power must be utilized for carrying out the electrosurgical functions and the operational mode of the generator supplying the high power must be carefully controlled.

U.S. Pat. No. 3,699,967, referenced hereinabove, describes an isolated output electrosurgical generator that utilizes a "floating winding" in a transformer to provide safety against fault currents in the operating room. For such a device it is important that there be no stray electrical coupling from the output of the isolating system to any particular potential reference. Yet, as described in the above cited patent, it is advantageous to provide an electrosurgical apparatus that provides a means at the electrosurgical instrument for switching the power generator between preselected modes of operation as, for example, from a cutting mode to a coagulation mode or from a coagulation mode to a cutting mode. Such an apparatus allows the surgeon to operate in the most convenient manner since the mode of operation can be directly selected at the instrument rather than controlling the mode of operation from a more remote location, via remote switch, such as would occur through use of a foot switch, for example.

Obviously, the switch or other control device of the electrosurgical instrument must be connected to the internal circuitry of the electrosurgical apparatus through wires extending between such circuitry and the utilization instrument. Since the wires coupling the RF potential output from the electrosurgical generator to the utilization instrument are normally contained in the same bundle, the wires are therefore commonly adjacent to one another and the capacity between the "active" output wires and the switching wires produces stray coupling currents at the RF potentials normally utilized for electrosurgery.

The above-identified patent compensates for this stray coupling by using a low capacitance decoupling circuit to transfer information pertaining to the mode of operation from the instrument to the generator. Such a decoupling circuit allows active electrosurgical switching with negligible contribution to the patient terminal RF leakage current. More specifically, the above-identified patent solves the stray coupling problem by passing a DC current through RF chokes as well as through the switch in the electrosurgical instrument and the control relays. The electromotive force causing the current to flow is provided by a conventional AC to DC converter, and the RF chokes provide the desired degree of isolation by presenting very high impedence at the frequency of the electrosurgical potential and a low impedance at the direct current used to operate the relays.

U.S. Pat. No. 3,801,800, referenced above, describes an isolating switching circuit suitable for use in electrosurgical generator to transmit mode information from the electrosurgical instrument to the electrosurgical power generator. In the device described in said u.S. Pat. No. 3,801,800, light emitting diodes are energized in accordance with the setting of an operational mode selection switch located in the electrosurgical instrument, the light emitted impinging on an associated light activated transistor to control the mode of operation of the electrosurgical power generator so that the desired cutting or coagulating RF potential is generated and applied to the instrument.

SUMMARY OF THE INVENTION

This invention provides an improved power transmitting and isolating switching circuit that is highly reliable and well suited for use in an electrosurgical generator. Isolated switching is achieved by predetermined loading of the isolating transformer used for coupling power from the power generator to the utilization instrument, the transformer loading being sensed and the sensed load information used to control operational mode of the power generator.

It is therefore an object of this invention to provide an improved signal transmitting and isolated switching circuit.

It is another object of this invention to provide an improved transformer coupled power transmitting and isolated switching circuit for an electrosurgical apparatus.

It is still another object of this invention to provide an improved signal transmitting and isolated switching circuit wherein a transformer is loaded in a predetermined manner reflecting a selected operational mode and the loading of the transformer sensed with the sensed information being utilized to control a power generator connected with said transformer so that preselected power is supplied for the selected operational mode.

With these and other objects in view, which will become apparent to one skilled in the art as the description proceeds, this invention resides in the novel construction, combination, and arrangement of parts substantially as hereinafter described and more particularly defined by the appended claims, it being understood that such changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which.

DESCRIPTION OF THE INVENTION

While the power transmitting and isolated switching circuit of this invention could be utilized in a variety of applications including apparatus suitable for use in electrosurgery for cutting and coagulation, this invention may specifically be utilized in conjunction with the electrosurgical generator described in U.S. Pat. No. 3,699,967, referenced above, and may be utilized in lieu of the isolated switching circuitry shown and described in U.S. Pat. No. 3,801,800, also referenced above. While this invention is not meant to be limited to utilization with the specific electrosurgical apparatus shown in U.S. Pat. No. 3,699,967, this patent may be referred to for a more complete understanding of certain details of the electrosurgical generator and utilization instrument which have not been set forth herein.

Figure 1:
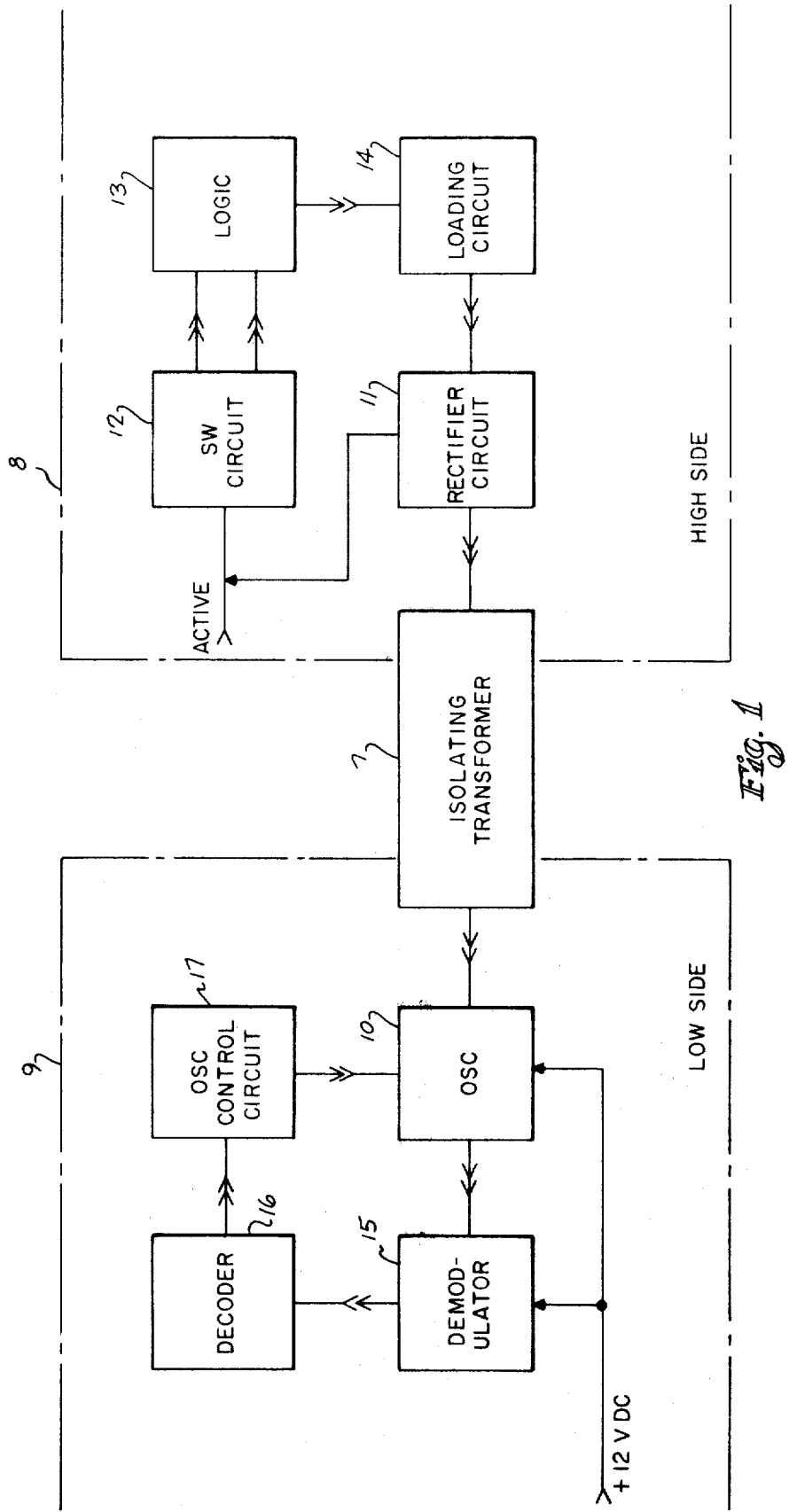
FIG. 1 is a block diagram of the power transmitting and isolated switching circuit of this invention.

As shown in FIG. 1, the circuit includes an isolating transformer 7 which separates and isolates high side electronics 8 from low side electronics 9. The electrosurgical power generator includes an oscillator 10 supplying power to isolating transformer 7, the output of which is coupled through a rectifier circuit 11 to the active electrode (not shown) of the utilization instrument.

For selection of the mode of operation, a switching circuit 12 is connected between the active electrode and logic circuit 13. The logic circuit controls loading of loading circuit 14, which circuit loads transformer 7 in a predetermined manner depending upon the mode of operation desired.

The loading of isolating transformer 7 is sensed at demodulator 15 connected with oscillator 10 and the output of demodulator 15 is coupled to decoder 16. The decoded loading information is then coupled to oscillator control 17 (including relays, for example, as shown in U.S. Pat. No. 3,699,967) to thereby control the oscillator and reliably establish the mode of operation desired. Thus, the transformer is loaded in a predetermined manner and the loading sensed with the sensed information being utilized to establish the desired mode of operation.

Figure 2:
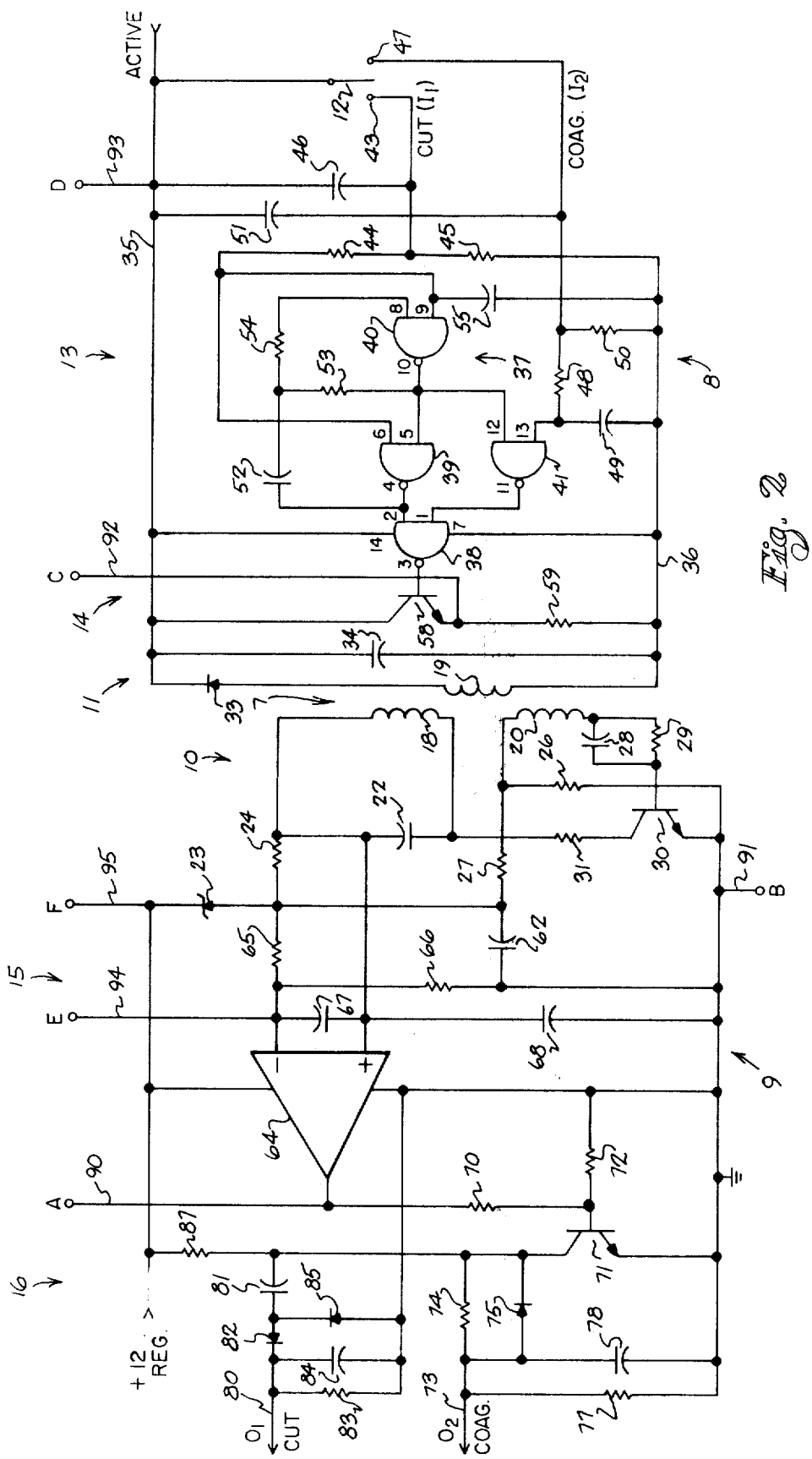
FIG. 2 is an electronic schematic diagram of the invention shown in block form in FIG. 1.

Referring now to FIG. 2, isolating transformer 7 is shown to include feedback winding 18, secondary winding 19 and primary winding 20. Winding 18 preferably has 12 turns while winding 19 preferably has 14 turns, and winding 20 preferably has 8 turns. Winding 18 has a capacitor 22 in parallel therewith, while one junction of winding 18 and capacitor 22 is connected to Zener diode 23 (connected at its opposite side to a +12 volt regulated power supply) through resistor 24. In addition, one side of winding 20 is connected to the junction of resistors 26 and 27 which extend as a voltage divider between Zener diode 23 and ground. The other side of winding 20 is connected through parallel connected capacitor 28 and resistor 29 to the base of transistor 30, the emitter of which transistor is grounded and the collected of which transistor is connected through resistor 31 to the junction of primary winding 18 and capacitor 22 opposite to that connected with Zener diode 23.

Rectifier circuit 11 includes diode 33 connected to one side of secondary winding 19 and capacitor 34 connected in parallel with secondary winding 19 and diode 33. One side of the junction of diode 33 and capacitor 34 is connected to lead 35 leading to the active electrode of the electrosurgical utilization instrument while the opposite side of the junction of secondary 19 and capacitor 34 is connected to lead 36.

Logic circuit 13 includes an integrated circuit 37 having interconnected NAND gates 38, 39, 40 and 41. The logic circuit is controlled by the positioning of switch 12. As shown in FIG. 2, when the movable arm of switch 12 is in contact with stationary contact 43, this signifies that the cut mode of operation is desired (the cut mode being referred to hereinafter as $I_1$).

Stationary contact 43 of switch 12 is connected through resistor 44 to pin 6 of the integrated circuit and more particularly to one input of NAND gate 39. In addition, contact 43 is connected through resistor 45 to lead 36 (connected with secondary winding 19 of transformer 7). In addition, a capacitor 46 is connected between the active electrode of the electrosurgical instrument and stationary contact 43 of switch 12.

Stationary contact 47 of switch 12 is utilized to establish the coagulation mode (hereinafter referred to as $I_2$). As shown in FIG. 2, stationary contact 47 is connected through resistor 48 to pin 13 of the integrated circuit and more particularly to one input of NAND gate 41 with opposite sides of the resistor being connected with lead 36 through capacitor 49 and resistor 50. Pin 2 of the integrated circuit and more particularly one input of NAND gate 38 is connected through capacitor 52 and resistor 53 to pins 5 and 10 of the integrated circuit and more particularly to the other input of NAND gate 39 and the output of NAND gate 40, respectively, with the junction of capacitor 52 and resistor 53 being connected through resistor 54 to pin 8 of the integrated circuit and more particularly to one input of NAND gate 40. The other input of NAND gate 40 (pin 9 of the integrated circuit) is connected through capacitor 55 to the lead 36.

The output from the integrated circuit is taken from pin 3 and more particularly from the output of NAND gate 38 and coupled to the base of transistor 58 of loading circuit 14. The collector of transistor 58 is connected to lead 35 while the emitter is connected to lead 36 through resistor 59.

At low side electronics 9, a capacitor 62 utilized for power distribution is connected between ground and the junction of Zener diode 23 and resistor 27. Also at low side electronics 9, demodulator 15 includes integrating circuit 64 one input of which is connected to the junction of resistors 65 and 66 extending between ground and the junction of Zener diode 23 and resistor 24. The inputs to integrated circuit 64 have a capacitor 67 therebetween and a capacitor 68 extends between the second input and ground.

The output from demodulator 15 is taken from the output of integrated circuit 64 and coupled through resistor 70 to the base of transistor 71 which base is connected to ground through resistor 72. The emitter of transistor 71 is directly connected to ground. The connector of transistor 71 is connected to the coagulation output lead 73 (hereinafter referred to as $O_2$) through resistor 74, which resistor has a diode 75 in parallel therewith. In addition, the junction of resistor 74 and diode 75 is connected to ground through parallel connected resistor 77 and capacitor 78.

The collector of transistor 71 is also connected to cut lead 80 (hereinafter referred to as $O_1$) through capacitor 81 and diode 82 with lead 80 being connected to integrated circuit 64 through parallel connected resistor 83, capacitor 84, and diode 85. In addition, the collector of transistor 71 is connected to the +12 volt regulated power supply through resistor 87. The cut and coagulation outputs ($O_1$ and $O_2$) are coupled to the oscillator control circuitry 17 as indicated in FIG. 1 and as brought out hereinabove may be connected with relays (not shown) to thereby control the mode of operation of the oscillator (or reference generator).

The following components may be utilized for the embodiment shown in schematic form in FIG. 2, it being realized that the invention is not meant to be limited to the illustrative listing as set forth:

Capacitors (in $\mu Fd$): 22–0.15; 28–0.02; 34–0.1; 46–0.01; 49–0.01; 52–2700pF; 55–0.01; 62–20; 67–0.15; 68–1.0; 78–0.1; 81–0.033; and 84–0.5

Resistors (in ohms): 24–15; 26–300; 27–2.2K; 29–4.7K; 31–33; 44–22K; 45–22K; 48–22K; 50–22K; 53–51K; 54–100K; 59–1K; 65–270; 66-selectable (nominally 15K); 70–22K; 72–22K; 74–100K; 77–270K; 83–150K; and 87–3.9K Transistors: 30–2N3904; 58–2N4275; and 71–2N3904

Diodes: all 1N4148

Zener diode (23): 1N754A and

Integrated circuits: 37–CO4011AE; and 64–½μA749.

Figure 3:
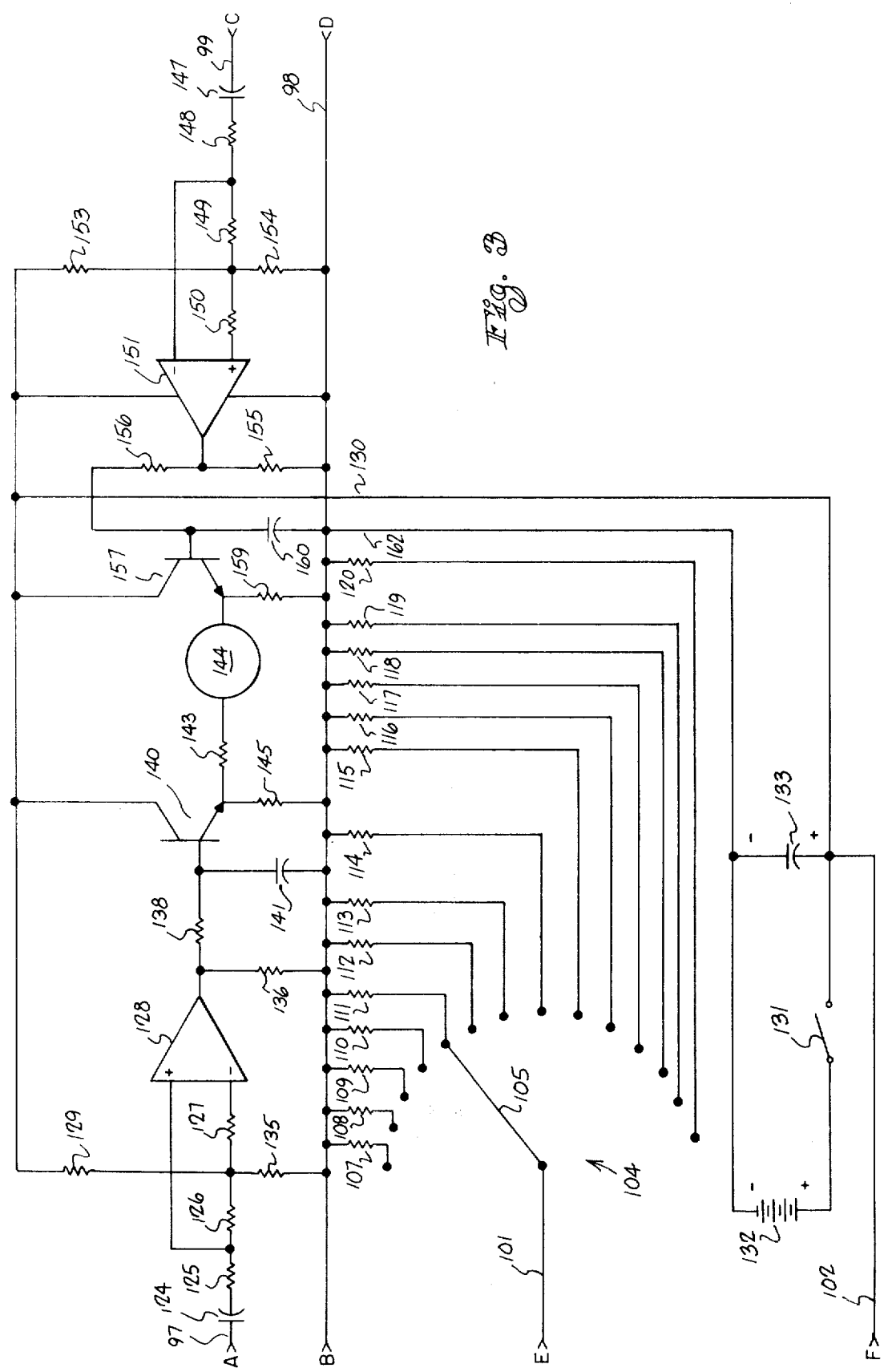
FIG. 3 is an electronic schematic diagram of circuitry to be attached to the circuit set forth in FIG. 2 for selection of a particular resistive component therein.

A selective circuit for selecting the resistor 66 shown in FIG. 2 is illustrated by electronic schematic in FIG. 3. The selective circuit is connected at a plurality of points illustrated in FIGS. 2 and 3 by the letters A through F. In FIG. 2, the junctions A through F are connected to leads 90 through 95, respectively. As shown, in FIG. 3, junction A is connected to lead 97, junction B is connected to lead 98, junction C is connected to lead 99, junction D is also connected to lead 98, junction E is connected to lead 101 and junction F is connected to lead 102.

Junction E leading from integrated circuit 64 of demodulator 15 is connected to switch 104 and more particularly to rotatable contact 105 thereof. Rotatable contact 105 is positionable so as to select one for fourteen differently valued resistors 107 through 120, all of said resistors being connected in common with line 98.

Junction A is connected from the output of integrated circuit 64 of demodulator 15 and coupled in the selecting circuit through lead 97, capacitor 124, and resistors 125, 126 and 127 to one input of operational amplifier 128, the other input of which is connected to the junction between resistors 125 and 126. In addition, the junction of resistors 126 and 127 is connected through resistor 129 and lead 130 to one pole of switch 131 connected with power supply 132, the power supply 132 and switch 131 having a capacitor 133 thereacross.

In addition, the junction of resistors 126 and 127 is connected through resistors 135 to lead 98, while the output of operational amplifier 128 is conneted through resistor 136 to lead 98 and through resistor 138 to the base of transistor 140, which base has a capacitor 141 connecting the base with lead 98. The emitter of transistor 140 is connected through resistor 143 to meter 144, the emitter also being connected through resistor 145 to lead 98.

Junction C from the emitter of transistor 58 of loading circuit 14 is connected in the selecting circuit through lead 99, capacitor 147, and resistors 148, 149 and 150 to one input of operational amplifier 151, the other input of which is connected to the junction between resistors 148 and 149. In addition, a resistor 153 is connected at one side to the power supply through lead 130, while the other side of the resistor is connected to the junction of resistors 149 and 150, which junction is also connected to lead 98 through resistor 154. The output of operational amplifier 151 is also connected to lead 98 through resistor 155 and is connected through resistor 156 to the base of transistor 157 the emitter of which is connected to meter 144 and has a resistor 159 extending between the emitter and lead 98. In addition, the base of transistor 157 is connected to lead 98 through capacitor 160, and lead 98 is connected to the negative side of the power supply through lead 162.

An illustrative listing of components that may be utilized for the selection circuit shown in FIG. 3 is as follows, it being understood that the invention is not meant to be limited to the components set forth:

Capacitors (in $\mu Fd$): 124–0.005; 133–10; 141–1.0; 147–0.005; and 160–1.0

Resistors (in ohms): 107–8.2K; 108–9.1K; 109–10K; 110–11K; 111–12K; 112–13K; 113–15K; 114–16K; 115–18K; 116–20K; 117–22K; 118–24K; 119–27K; 120–30K; 125–910K; 126–100K; 127–100K; 129–6.8K; 135–5.1K; 136–8.2K; 138–100K; 143–18K; 145–12K; 148–910K; 149–100K; 150–100K; 153–6.8K; 154–5.1K; 155–8.2K; 156–100K; and 159–12K Transistors: 140 and 157–2N3904

Meter (144): 100–0–100 A; and

Integrated Circuits: 128 and 151: ½μA749.

In operation, the selecting circuit is connected to the signal transmitter and isolation circuit by connecting junctions A through F as indicated. The power switch 131 is then closed. Starting with the rotary switch 104 in the position connected to resistor 113, rotary switch 104 is rotated to find the best null on meter 144 the value of that resistor then being utilized for resistor 66 in the circuit shown in FIG. 2. During this selection process, resistor 66, of course, is not in the circuit shown in FIG. 2, but instead is inserted after the correct value is found. The selecting circuit is removed after the correct resistor value is established since the circuit is no longer needed.

Turning now to the operation of the power transmitting and isolating switching circuit, isolating transformer 7 couples high frequency power from the low side 9 to the high side 8. The same transformer also couples the desired operational mode information from the high side 8 to the low side 9. The secondary of transformer 7 may be raised to a potential in excess of 10 kilovolts without breakdown of the low side. Oscillator 10 excites transformer 7 with high frequency potential and the power from this excitation drives the high side electronics. In addition, oscillator 10 has an output impedence high enough to permit detection of signal information.

At high side 8, power is utilized from the low side to modulate stimulation on the high frequency excitation in the isolating transformer 7. This modulation has two states. In the first state, that is, when transistor 58 of loading circuit 14 is conducting (at this time the output from pin 3 of integrating circuit 37 is high), isolating transformer 7 is loaded. In the second state, that is when transistor 58 of loading circuit 14 is not conducting (at this time the output from pin 3 of integrating circuit 37 is low), isolating transformer 7 is unloaded.

Diode 33 of rectifier 11 supplies DC voltage to drive integrating circuit 37 and the integrating circuit processes the input information from the switch 12 to modulate that is, to load or unload transformer 7 with the desired operational mode information. When $I_2$ (coagulation) is high (that is, by being connected through switch 12 to the active electrode), transistor 58 of loading circuit 14 conducts continuously and the isolating transformer 7 is continuously loaded. When $I_1$ (cut) is high, however, (that is, by being connected through switch 12 to the active electrode), transistor 58 of loading circuit 14 is pulsed at a low rate, preferably 3 kHz and the isolating transformer 7 is pulse loaded. If both $I_1$ and $I_2$ should be high, the circuit would respond as if only $I_1$ were high. When both $I_1$ and $I_2$ are low, the isolating transformer 7 is in the unloaded state.

At low side 9, the loading of isolating transformer 7 is sensed and the sensed information used to control oscillator 10 to effect operation in the selected operational mode. Transistor 30 of oscillator 10 draws higher current through resistor 24 when the transformer is loaded. There are two current states of resistor 24 corresponding to the two modulation (or loading) states of transistor 58 of loading circuit 14, and these two current states of resistor 24 correspond to two voltage states across the resistor, the voltage being filtered by capacitor 68.

Integrated circuit 64 of the demodulator 15 senses the two voltage states across resistor 24 (and hence senses the loading of isolating transformer 7). When the voltage across resistor 24 is low, the output of integrated circuit 64 is high, and when the voltage across resistor 24 is high, the output of integrated circuit 64 is low. The former state corresponds to transistor 58 of loading circuit 14 being in a nonconductive state and the latter state responding to transistor 58 being in a conductive state.

Transistor 71 is driven by integrated circuit 64 and this drives the output decoding circuitry 16. When transistor 58 of loading circuit 14 is pulsed, transistor 71 is likewise pulsed, and each pulse discharges capacitor 81 into capacitor 84 through diode 82. Capacitor 78 charges slightly with each pulse, but is discharged at the end of each pulse through diode 75.

When transistor 58 of loading circuit 14 is continuously conducting, transistor 71 is continuously nonconducting. This causes capacitor 81 to discharge only once into capacitor 84 through diode 82, and capacitor 84 charges only a small amount and then discharges through resistor 83. Capacitor 78 charges through resistor 74 and remains at a high level as long as transistor 71 is nonconducting.

The resulting input-output may thus be summarized as follows:

1. With $I_1$ high (connected to active electrode) this results in pulse loading of current transformer 7 which causes transistor 71 to be pulsed into and out of the conductive state so that $O_1$ (cut) becomes high while $O_2$ (coagulation) remains low;
2. With $I_2$ high (connected to active electrode), this results in continuous loading of transformer 7 and $O_2$ (coagulation) becomes high while $O_1$ (cut) remains low;
3. With both $I_1$ and $I_2$ high, the loading of transformer 7 is pulsed, and only $O_1$ (cut) becomes high; and
4. With both $I_1$ and $I_2$ low, there is no loading of transformer and both $O_1$ (cut) and $O_2$ (coagulation) remain low.

Thus, it can be seen from the foregoing that this invention provides an improved power transmitting and isolated switching circuit that is highly reliable and well suited for use in an electrosurgical apparatus.

What is claimed is:

1. In an electrosurgical apparatus having a power generator and a utilization instrument, a power transmitting and isolating control circuit to transmit power from the power generator to the utilization instrument and to transmit mode information from the utilization instrument to the power generator, the said transmitting and isolating control circuit comprising:
   mode control means at said utilization instrument;
   transformer means;
   transformer loading means connected with said transformer means to load the same;
   load control means responsive to said mode control means and connected with said transformer loading means for establishing a predetermined loading on said transformer means by said transformer loading means;
   power generating means connected with said transformer means;
   sensing means connected with said power generating means to sense the loading of said transformer means; and
   power generating control means connected with said sensing means and responsive to said loading sensed by said sensing means to thereby control the mode of operation of said power generating means.

2. The power transmitting and isolating control circuit of claim 1 wherein said mode control means has two different settings, wherein said load control means establishes different predetermined loadings of said transformer means responsive to said different settings of said mode control means, and wherein said power generating control means controls said power generating means to operate in different preselected modes depending upon the setting of said mode control means.

3. The power transmitting and isolating control circuit of claim 2 wherein said mode control means has a first setting for electrosurgical cutting and a second setting for electrosurgical coagulation, and wherein said power generating means operates in a cut mode when said mode control means is in said first setting and operates in a coagulation mode when said mode control means is in said second setting.

4. The power transmitting and isolating control circuit of claim 1 wherein said sensing means includes demodulator means for sensing loading of said transformer means.

5. The power transmitting and isolating control circuit of claim 4 wherein said demodulator means includes an integrated circuit having a precisely selected resistance means connected therewith.

6. The power transmitting and isolating control circuit of claim 5 wherein said integrated circuit includes a selection circuit for precise selection of said resistance means to be utilized in said demodulator means.

7. The power transmitting and isolating control circuit of claim 6 wherein said selection circuit includes a selector switch, a plurality of resistances selectively introduceable into said selection circuit by said selector switch, a meter, and signal processing circuitry including an operational amplifier and series connected transistor connecting opposite sides of said meter with predetermined points in said power transmitting and isolating control circuit and with said selector switch of said selection circuit.

8. In an electrosurgical apparatus, a power generating and isolating control circuit comprising:
   isolating transformer means;
   transformer loading means connected with said transformer means to load the same;
   load control means connected with said transformer loading means for establishing at least one predetermined loading on said transformer means by said transformer loading means;
   said transformer loading means including a first transistor the conductive state of which is controlled by said load control means;
   power generating means connected with said transformer means; and
   power generating control means connected with said power generating means to sense at least said predetermined loading of said transformer means and responsive thereto controlling operation of said power generating means, said power generating control means including demodulator means for sensing loading of said transformer means and decoding and control means for establishing operation of said power generating means in response to said sensed loading of said transformer means, said decoding and control means including a second transistor the conductive state of which is responsive to the conductive state of said first transistor in said transformer loading means, and said decoding and controlling means also including first and second signal processing means connected with said second transistor in said decoding and control means to provide an output for only one of said signal processing means depending upon the sensed loading of said transformer means.

9. In an electrosurgical apparatus, a power generating and isolating control circuit comprising:
   an isolating transformer having primary and secondary windings;
   a first transistor across the secondary winding of said isolating transformer for loading said isolating transformer;
   a logic circuit means for controlling conduction of said first transistor to thereby establish two predetermined different loadings of said transformer;
   an oscillator means for generating an RF signal and coupling the same to the primary winding of said isolating transformer;
   a demodulator means connected with said oscillator for sensing the loading of said isolating transformer;
   a decoder means connected with said demodulator means, said decoder means including a second transistor the conduction of which is dependent upon the conduction of said first transistor, said decoder means also including first and second processing circuits connected with said second transistor in a manner such that said first signal processing circuit provides an output signal when a first of said predetermined transformer loadings is sensed by said demodulator means and said second signal processing circuit provides an output signal when the second of said predetermined transformer loadings is sensed by said demodulator means whereby separate modes of operation of said oscillator means can be established.

10. The power generating and isolating control circuit of claim 9 wherein said logic circuit means also includes a switch means to establish a cut mode and a coagulation mode, said switch means controlling said logic circuit means to effect loading of said transformer in a different predetermined manner for each said mode, and wherein said circuit means further includes control means connected with said signal processing circuits to cause said oscillator means to operate in the mode selected at said switch means.

11. The power generating and isolating control circuit of claim 10 wherein said first transistor is caused to continuously conduct to load said transformer continuously when said switch means is positioned for coagulation mode, said continuous loading of said transformer being sensed by said demodulator means to cause said second transistor to be continuously nonconductive so that said first signal processing circuit produces an output to establish said coagulation mode and wherein said first transistor is caused to be repeatedly alternated between conductive and nonconductive states to pulse load said transformer, when said switch means is positioned for cut mode, said pulse loading being sensed by said demmodulator means to cause said second transistor to repeatedly alternate between conductive and nonconductive states so that said second signal processing circuit provides an output to establish said cut mode.

12. In an electrosurgical apparatus, a power generating and isolating control circuit comprising:
   isolating transformer means;
   transformer loading means connected with said transformer means to load the same;
   load control means connected with said transformer loading means for establishing at least one predetermined loading of said transformer means by said transformer loading means;
   said transformer loading means including a first valve means the conductive state of which is controlled by said load control means;
   power generating means connected with said transformer means; and
   power generating control means connected to said power generating means to sense at least said predetermined loading of said transformer means and responsive thereto controlling operation of said power generating means, said power generating control means including demodulator means for sensing loading of said transformer means and decoding and control means for establishing operation of said power generating means in response to said sensed loading of said transformer means, said decoding and control means including a second valve means the conductive state of which is responsive to the conductive state of said first valve means in said transformer loading means, and said decoding and controlling means also including first and second signal processing means connected with said second valve means in said decoding and control means to provide an output for only one of said signal processing means depending upon the sensed loading of said transformer means.

* * * * *